(12) United States Patent
Wilczynski et al.

(10) Patent No.: US 12,192,300 B2
(45) Date of Patent: *Jan. 7, 2025

(54) SYSTEM ARCHITECTURE FOR ENABLING EFFICIENT INTER-APPLICATION COMMUNICATIONS

(71) Applicant: Palantir Technologies Inc., Denver, CO (US)

(72) Inventors: Peter Wilczynski, San Francisco, CA (US); Christopher Hammett, Washington, DC (US); Lloyd Ho, Palo Alto, CA (US); Sharon Hao, Redwood City, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,670

(22) Filed: Sep. 11, 2023

(65) Prior Publication Data

US 2023/0421658 A1 Dec. 28, 2023

Related U.S. Application Data

(63) Continuation of application No. 17/862,299, filed on Jul. 11, 2022, now Pat. No. 11,778,062, which is a
(Continued)

(51) Int. Cl.
*H04L 67/561* (2022.01)
*G06F 8/51* (2018.01)
(Continued)

(52) U.S. Cl.
CPC .............. *H04L 67/561* (2022.05); *G06F 8/51* (2013.01); *G06F 8/76* (2013.01); *H04L 67/02* (2013.01);
(Continued)

(58) Field of Classification Search
CPC ... H04L 67/561; H04L 67/566; H04L 67/564; H04L 67/02; G06F 8/51; G06F 8/76
See application file for complete search history.

(56) References Cited

U.S. PATENT DOCUMENTS

| 6,067,565 | A  | 5/2000 | Horvitz |
| 6,182,133 | B1 | 1/2001 | Horvitz |
| (Continued) | | | |

FOREIGN PATENT DOCUMENTS

EP 3623947 3/2020

OTHER PUBLICATIONS

U.S. Pat. No. 10,681,165, System Architecture for Enabling Efficient Inter-Application Communicaions, Jun. 9, 2020.
(Continued)

*Primary Examiner* — Minh Chau Nguyen
(74) *Attorney, Agent, or Firm* — Knobbe, Martens, Olson & Bear, LLP

(57) ABSTRACT

A system architecture can be used to facilitate communication among applications that are native and/or non-native to an application environment. The system architecture can include a first application environment executed on a client-side computing device. The first application environment can execute software applications that are native thereto. The first application environment can further execute software applications that are native thereto, but which software applications themselves comprise second application environments of types different from the first application environment, and which software applications can therefore execute additional software applications that are non-native to the first application environment. The first application environment can further execute a computation engine that
(Continued)

is configured to store and execute instructions received from the first software application, the second software application, or both.

20 Claims, 4 Drawing Sheets

Related U.S. Application Data continuation of application No. 16/894,623, filed on Jun. 5, 2020, now Pat. No. 11,388,249, which is a continuation of application No. 16/519,949, filed on Jul. 23, 2019, now Pat. No. 10,681,165.

(60) Provisional application No. 62/729,630, filed on Sep. 11, 2018.

(51) Int. Cl.
*G06F 8/76* (2018.01)
*H04L 67/02* (2022.01)
*H04L 67/564* (2022.01)
*H04L 67/566* (2022.01)

(52) U.S. Cl.
CPC .......... *H04L 67/564* (2022.05); *H04L 67/566* (2022.05)

(56) References Cited

U.S. PATENT DOCUMENTS

| | | | |
|---|---|---|---|
| 8,766,919 | B1 | 7/2014 | Lachwani et al. |
| 9,501,304 | B1* | 11/2016 | Powers .................. H04L 67/10 |
| 9,565,233 | B1 | 2/2017 | Ozuysal et al. |
| 9,922,006 | B1 | 3/2018 | Boynes |
| 10,681,165 | B2 | 6/2020 | Wilczynski et al. |
| 11,388,249 | B2 | 7/2022 | Wilczynski et al. |
| 11,778,062 | B2 | 10/2023 | Wilczynski et al. |
| 2002/0023143 | A1 | 2/2002 | Stephenson et al. |
| 2004/0039926 | A1 | 2/2004 | Lambert |
| 2007/0156845 | A1 | 7/2007 | Devanneaux et al. |
| 2008/0147671 | A1 | 6/2008 | Simon et al. |
| 2009/0307430 | A1 | 12/2009 | Bruening et al. |
| 2009/0313621 | A1* | 12/2009 | Dewa ............... G11B 20/00427 718/1 |
| 2012/0072498 | A1 | 3/2012 | Carter et al. |
| 2012/0284597 | A1 | 11/2012 | Burkard et al. |
| 2012/0311429 | A1 | 12/2012 | Decker et al. |
| 2012/0324043 | A1 | 12/2012 | Burkard et al. |
| 2013/0019159 | A1 | 1/2013 | Civelli et al. |
| 2013/0232540 | A1* | 9/2013 | Saidi ...................... H04L 63/10 726/1 |
| 2013/0235044 | A1 | 9/2013 | Kaleta et al. |
| 2014/0071151 | A1 | 3/2014 | Oesterreicher |
| 2014/0173592 | A1 | 6/2014 | y Arcas et al. |
| 2014/0379840 | A1 | 12/2014 | Dao |
| 2015/0052513 | A1 | 2/2015 | Robinson |
| 2015/0088968 | A1 | 3/2015 | Wei et al. |
| 2015/0089224 | A1 | 3/2015 | Beckman et al. |
| 2015/0310126 | A1 | 10/2015 | Steiner et al. |
| 2015/0339403 | A1 | 11/2015 | Teeraparpwong et al. |
| 2015/0370756 | A1 | 12/2015 | Steeb, III et al. |
| 2016/0224325 | A1* | 8/2016 | Sidwell .................. G06F 9/445 |
| 2016/0371081 | A1* | 12/2016 | Powers ............... G06F 9/45504 |
| 2017/0195736 | A1 | 7/2017 | Chai et al. |
| 2017/0221109 | A1 | 8/2017 | Liu et al. |
| 2017/0280434 | A1 | 9/2017 | Begeja et al. |
| 2017/0286392 | A1 | 10/2017 | Wang |
| 2017/0293616 | A1 | 10/2017 | Li et al. |
| 2018/0024872 | A1 | 1/2018 | Meijer et al. |
| 2018/0032491 | A1 | 2/2018 | Heo et al. |
| 2018/0322688 | A1 | 11/2018 | Ozguner et al. |
| 2019/0005048 | A1 | 1/2019 | Crivello et al. |

OTHER PUBLICATIONS

U.S. Pat. No. 11,388,249, System Architecture for Enabling Efficient Inter-Application Communicaions, Jul. 12, 2022.
U.S. Pat. No. 11,778,062, System Architecture for Enabling Efficient Inter-Application Communicaions, Oct. 3, 2023.
Garsiel et al., "How Browsers Work: Behind the Scenes of Modern Web Browsers", published to web on Aug. 5, 2011 at https://www.html5rocks.com/en/tutorials/internals/howbrowserswork/, retrieved on Jan. 22, 2019 (Year: 2011).
"Improving Performance With the Paint Timing API", published to web on Oct. 6, 2017 at https://www.sitepen.com/blog/improving-performance-with-the-paint-timing-api/, retrieved on Jan. 22, 2019 (Year: 2017).
Wagner, "Using the Paint Timing API", published to web on Aug. 21, 2017 at https://css-tricks.com/paint-timing-api/, retrieved on Jan. 22, 2019 (Year: 2017).
Zlatkov, "How JavaScript Works: The Rendering Engine and Tips to Optimize Its Performance" published to web on Mar. 15, 2018 at https://blog.sessionstack.com/how-javascript-works-the-rendering-engine-and-tips-to-optimize-its-performance-7b95553baeda, retrieved on Jan. 22, 2019 (Year: 2018).
Official Communication for European Patent Application No. 19196716.5 dated Jan. 28, 2020, 8 pages.
Official Communication for European Patent Application No. 19196716.5 dated Aug. 24, 2021, 78 pages.
Official Communication for European Patent Application No. 19196716.5 dated Oct. 10, 2023, 12 pages.
Official Communication for European Patent Application No. 19196716.5 dated May 13, 2024, 4 pages.
Official Communication for European Patent Application No. 19196716.5 dated May 17, 2024, 5 pages.

* cited by examiner

SYSTEM ARCHITECTURE FOR ENABLING EFFICIENT INTER-APPLICATION COMMUNICATIONS

INCORPORATION BY REFERENCE TO ANY PRIORITY APPLICATIONS

This application is a continuation of U.S. patent application Ser. No. 17/862,299, entitled "SYSTEM ARCHITECTURE FOR ENABLING EFFICIENT INTER-APPLICATION COMMUNICATIONS", filed Jul. 11, 2022, which is a continuation of U.S. patent application Ser. No. 16/894,623, entitled "SYSTEM ARCHITECTURE FOR ENABLING EFFICIENT INTER-APPLICATION COMMUNICATIONS", filed Jun. 5, 2020, now U.S. Pat. No. 11,388,249, which is a continuation of U.S. patent application Ser. No. 16/519,949, entitled "SYSTEM ARCHITECTURE FOR ENABLING EFFICIENT INTER-APPLICATION COMMUNICATIONS", filed Jul. 23, 2019, now U.S. Pat. No. 10,681,165, which claims benefit of U.S. Provisional Patent Application No. 62/729,630, entitled "SYSTEM ARCHITECTURE FOR ENABLING EFFICIENT INTER-APPLICATION COMMUNICATIONS," filed Sep. 11, 2018, each of which is hereby incorporated by reference in its entirety.

Any and all applications for which a foreign or domestic priority claim is identified in the Application Data Sheet as filed with the present application are hereby incorporated by reference under 37 CFR 1.57.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software architectures can be used to execute one or more applications, including applications of a plurality of languages. When handling such heterogeneous applications, a computing system may execute one or more of the applications by passing information from a front-end (e.g., client side) to a back-end (e.g., server-side). The back-end processing may occur external to the front-end (e.g., through the Internet). The front-end application may be configured to be executed in an application environment. For example, a software application may be written in HTML and JavaScript and may therefore be configured to execute in an application environment that can interpret HTML+JavaScript (e.g., in a web browser). As another example, a software application may be written in Java, and compiled to Java bytecode, and may therefore be configured to executed in an application environment that can interpret Java bytecode (e.g., a Java virtual machine). Thus, commands, requests, and application programming interfaces ("APIs") for any given software application may be configured to operate in a corresponding suitable application environment. However, challenges exist that, if overcome, would allow for better and more secure interoperability of applications that are written in a particular programming language and/or compiled into a particular format.

DETAILED DESCRIPTION

Terms

Figure 1:
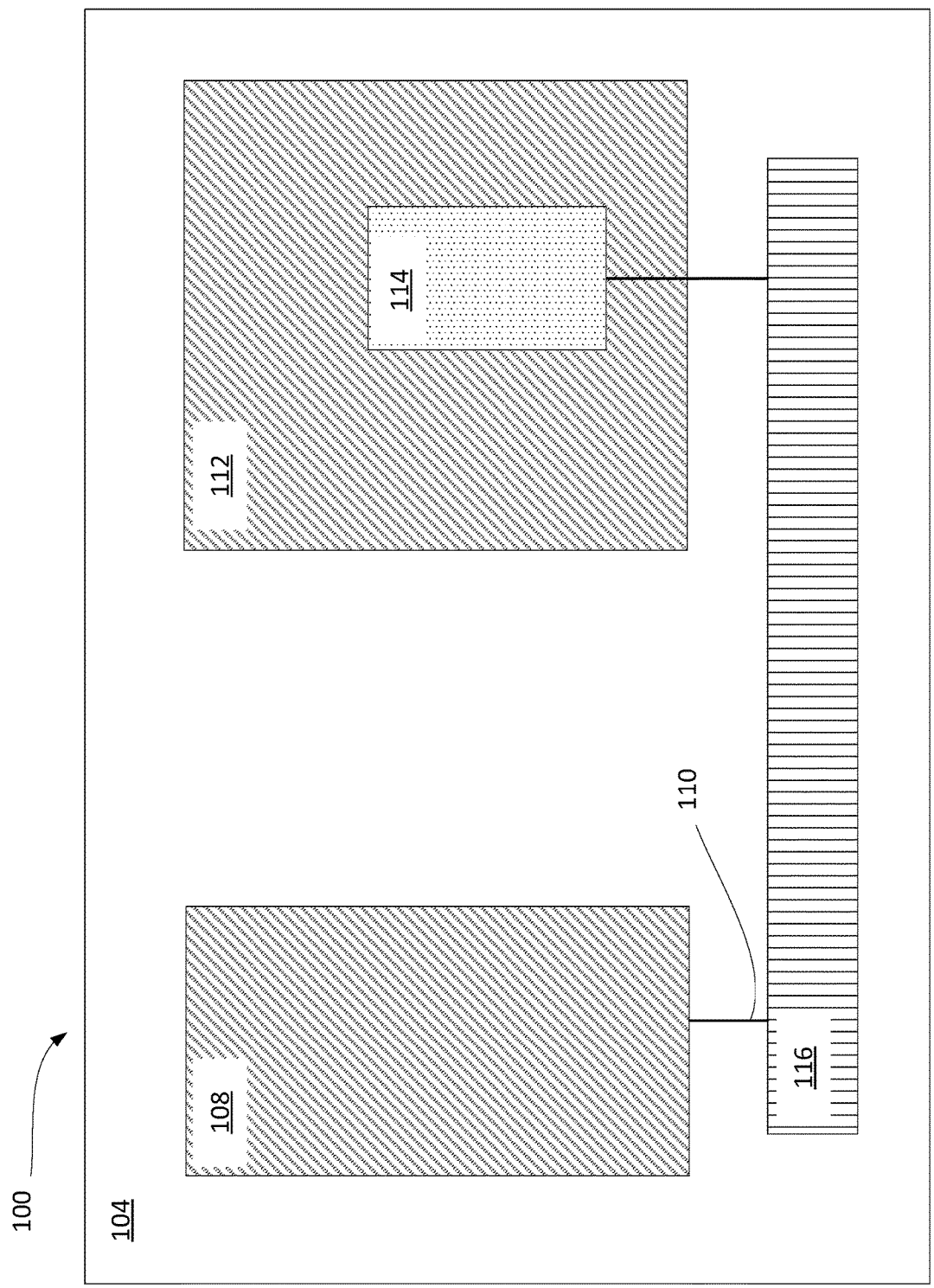
FIG. 1 is a block diagram showing various aspects of a system architecture, according to one implementation.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid-state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage). However, the hosted storage environment may additionally or alternatively be located on the client computing device.

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Item or Item: A data container for information representing specific things in the world that have a number of definable properties. For example, a data item can represent an entity such as a physical object, a parcel of land or other real property, a market instrument, a policy or contract, or other noun. Each data item may be associated with a unique identifier that uniquely identifies the data item. The item's attributes (e.g. metadata about the object) may be represented in one or more properties. Attributes may include, for example, a geographic location associated with the item, a value associated with the item, a probability associated with the item, an event associated with the item, and so forth.

Application Environment: A broad term that includes, among other things, any computing system or systems, including virtual computing systems, that are configured to execute one or more software applications, computer programs, or other software components. An application environment may be configured to execute software components that are written in one or more particular programming languages and/or are compiled/interpreted/prepared into one or more particular formats or structures. Application environments may also be referred to as "computing environments," "operating environments," or simply "environments." Application environments may be configured in a variety of configurations, examples of which are described in references to the various implementations of the present disclosure. For example, in some implementations, a software application may itself be an application environment, configured to execute or allow execution of other software applications. Accordingly, in various implementations, one or more of the "software applications" of the present disclosure may also be "application environments."

Overview

Reference will now be made in detail to example implementations, the examples of which are illustrated in the accompanying drawings. Whenever possible, the same reference numbers will be used throughout the drawings to refer to the same or like parts.

Software applications may be written in particular programming languages and/or compiled into particular formats that are configured to execute in application/computing environments suitable to run those applications. For example, a software application may be written in HTML and JavaScript and may therefore be configured to execute in an application environment that can interpret HTML+JavaScript (e.g., in a web browser). As another example, a software application may be written in Java, and compiled to Java bytecode, and may therefore be configured to executed in an application environment that can interpret Java bytecode (e.g., a Java virtual machine). Thus, commands, requests, and application programming interfaces ("APIs") for any given software application may be configured to operate in a corresponding suitable application environment. However, communication among applications can be challenging when running certain applications (e.g., Javascript) in a browser. Thus, a mechanism for routing requests and various information from one application to another application in a standardized way (e.g., using an application-independent language and/or using web idioms such as HTTP over TCP/IP) may be beneficial. Such routing techniques may provide improved and more efficient communication between applications.

For security reasons, on a given computing device, communications among various different application environments, or communications among various instances of a same type of application environment, may be restricted. For example, in modern web browsers, for security reasons each browser instance on a given computing device typically runs as a separate sandboxed instance, and communications among the instances are heavily restricted.

When multiple software applications execute on a single computing device, it may be advantageous for these multiple software applications to communicate with one another (e.g., to enable sharing of information and/or certain software functionality). However, the above-noted characteristics of software applications and application environments can create significant impediments to inter-application communications (e.g., communications among multiple software applications). This is particularly the case in instances where either or both of (1) the software applications execute in different types of application environments (e.g., application environments that are configured to interpret different languages/compiled executables); and (2) the software applications execute in different instances of application environments (e.g., where inter-application communications are restricted, even where the software applications/environments may be of the same type). For example, a tab-based interface (e.g., Chromium, etc.) may not be able (or designed) to communicate among the various tabs. In some cases, an application may communicate with another application, which then communicates (e.g., via a remote procedure call (RPC)) with a remote server or application.

The present disclosure describes various implementations of a technical system architecture that may overcome one or more of the above-noted technical challenges. According to an implementation, the system architecture includes the following characteristics: (1) a first application environment, executing on a client-side computing device, can execute software applications that are native to the first application environment (e.g., a Java virtual machine can execute Java applications); (2) the first application environment can further execute software applications that are native to the first application environment, but which software applications themselves comprise second application environments of types different from the first application environment, and which software applications can therefore execute additional software applications that are non-native to the first application environment (e.g., the Java virtual machine can execute a native web browser, which native web browser can execute HTML+JavaScript-based applications (which are non-native to the Java virtual machine)); (3) the first application environment can further execute a "proxy" software application that may coordinate and/or manage communication among various software applications in the first application environment. The proxy software application can further coordinate and/or manage communication among the software applications in the first application environment, and software application outside of the first application environment; (4) the first application environment can further include one or more data stores that may include data useable by the software applications in the first application environment to speed up data accessing and/or execution of various tasks. Establishment of, and access to, the one or more data stores may be managed by the proxy software application. The one or more data stores may provide caching of data from server-side devices, and/or may provide storage of data to speed up functionality of the software applications.

As described in further detail below, various alternative implementations of the present disclosure may include additional or fewer characteristics from those described in the above paragraph.

In general, software applications may be architected to include client-side components/applications (hereinafter also referred to as front-end components/applications) and server-side components/applications (hereinafter also referred to as back-end components/applications), which may communicate with one another via a communications link (e.g., a network link, the Internet, etc.) to bring about certain software application functionality. These architectures can allow a legacy architecture having a plurality of applications configured for one or more formats/languages to be usable by and/or with a format/language different from the legacy architecture. For example, using the architectures described herein can allow a newer web-based platform to interact with and/or execute non-web-based platforms. Advantageously, the usability and user experience of the mix of the web-based and non-web-based platforms can be relatively seamless and more enjoyable.

As noted above, according to an implementation, the system architecture of the present disclosure includes multiple front-end applications (e.g., the first application environment, the various software applications executing in the first application environment, and the proxy software application). According to an implementation, the software architecture of the present disclosure provides communications between these Front-end applications and one or more back-end elements via the proxy software application. Further, the proxy can manage routing of front-end application requests to certain back-end elements, the client-side data stores, and/or other front-end applications, as appropriate.

In an implementation, communications between the proxy software application and the other front-end applications can be accomplished via an interface definition language or other application-independent language. The interface definition language may be configured to output a result of a process or algorithm in one or more formats/languages that may be useful for another application (e.g., a software application 108 or a software application 114, as described in reference to various figures below) to read and understand.

Thus, according to various implementations, the system architecture of the present disclosure may advantageously enable inter-application communications among front-end applications in different types of application environments and/or executing in different instances of application environment. Further, the system architecture of the present disclosure may advantageously enable efficient routing of communications between front-end applications and back-end elements, and additionally communications with client-side data stores. Advantageously, the proxy software application may enable caching of data in the client-side data store (e.g., from the back-end elements), and/or may provide storage of data to speed up functionality of the front-end applications. Additionally, the system architecture may allow for improved initiation times of the software applications and/or application environments. For example, initiation of applications can occur on an as-needed basis where a particular application is initiated in the application environment when the application is needed rather than when compiling the application environment. Data storage (e.g., a data store operating within the application environment) may similarly be more efficiently allocated as cached data may only be needed for compiled applications within the application environment.

Exemplary Inter-Application Architectures

To provide a framework for the following discussion of specific systems and methods described herein, an example system architecture 100 will now be described with reference to FIGS. 1-3. This description is provided for the purpose of providing an example and is not intended to limit the techniques to the example system architecture.

FIG. 1 is a block diagram showing various aspects of a system architecture 100, according to one implementation. As shown in FIG. 1, the system architecture 100 can include exclusively client-side components/applications (e.g., "front-end" component/applications). In other configurations (e.g., see FIG. 2 below), the system architecture 100 can include other components/applications, such as server-side components/applications (e.g., "back-end" components/applications). The system architecture 100 can include a first application environment 104. The application environment 104 can be configured to execute one or more applications (e.g., software applications). The application environment 104 can be configured to execute applications native to the application environment 104. For example, the application environment 104 may be configured to execute applications of one or more particular software languages (e.g., JavaScript, HMTL, etc., or a combination thereof) or of a particular format (e.g., Java Bytecode executed by a Java virtual machine).

The application environment 104 can be configured to execute additional application environments, such as a second application environment 112. The application environment 112 can be configured to execute one or more applications. The application environment 112 can execute and run applications that are not native to the application environment 104. Non-native applications may be applications that are configured for execution by a software language and/or format different from that of the executing application environment. The application environment 112 may be configured to execute applications in one or more software languages. For example, the application environment 104 may be configured to execute applications in HTML+ JavaScript while the application environment 112 is configured to execute applications in Java. Other configurations are possible.

The application environment 104 may further be configured to execute a proxy application 116. The proxy application 116 may execute and/or pass information using an application-independent language, such as an interface definition language. The proxy application 116 may include a corresponding data interface (e.g., API) for one or more of the other applications and/or application environments executable by the application environment 104. One or more of the corresponding data interfaces may be configured to pass information in the application-independent language. Results or other information that is passed from one application are passed through the proxy application 116. Thus, in some implementations, the application passing the information may not be affected by whether it is passing the information directly to a destination application or through the proxy application 116 first. One or both of the first application environment 104 and/or the second application environment 112 may include a virtual computing environment/virtual machine (e.g., a Java Virtual Machine), a web browser, and/or the like. The proxy application 116 may coordinate and/or manage communication among the various software applications 108 in the first application environment 104. The proxy application 116 can further coordinate and/or manage communication among various software applications (e.g., the software application 108, the application environment 112, the software application 114) in the first application environment 104, and software application(s) outside of the first application environment 104. Accordingly, via the proxy application 116 the system may route requests and various information from one application to another application in a standardized way (e.g., using an application-independent language and/or HTTP over TCP/IP).

The system architecture 100 may include an application registry that interacts with the proxy application 116. The application registry may include information about one or more software applications 108. The proxy application 116 may call information from the application registry. The application registry may be stored in a front-end server or database (e.g., a data store 120 described below).

The one or more software applications 108 and the application environment 112 (and/or any other applications or application environments executable by the application environment 104) may be in communication with the proxy application 116. A data connection 110 may exist between the software application 108 and the proxy application 116. The data connection 110 may include one or more data interfaces configured to pass information therethrough. For example, the software application 108 and proxy application 116 may each have corresponding data interfaces configured to allow communication between each. The data connection 110 may represent a communication between said data interfaces. Additionally or alternatively, a data connection 110 may exist between the second software application 114 and the proxy application 116. The data connection 110 may be between the software application 114 and the application environment 112 and then a separate data connection 110 may exist between the application environment 112 and the proxy application 116. In some implementations, such as in FIG. 1, the data connection 110 directly connects the software application 114 and the proxy application 116. Thus, corresponding data interfaces may be included in each of the software application 114 and the proxy application 116 to allow for information passing therethrough. Data connections 110 may be configured such that the software application(s) 104 are compiled in an interface definition language to allow standardization of communication among the various software applications 104 and/or application environments.

Figure 2:
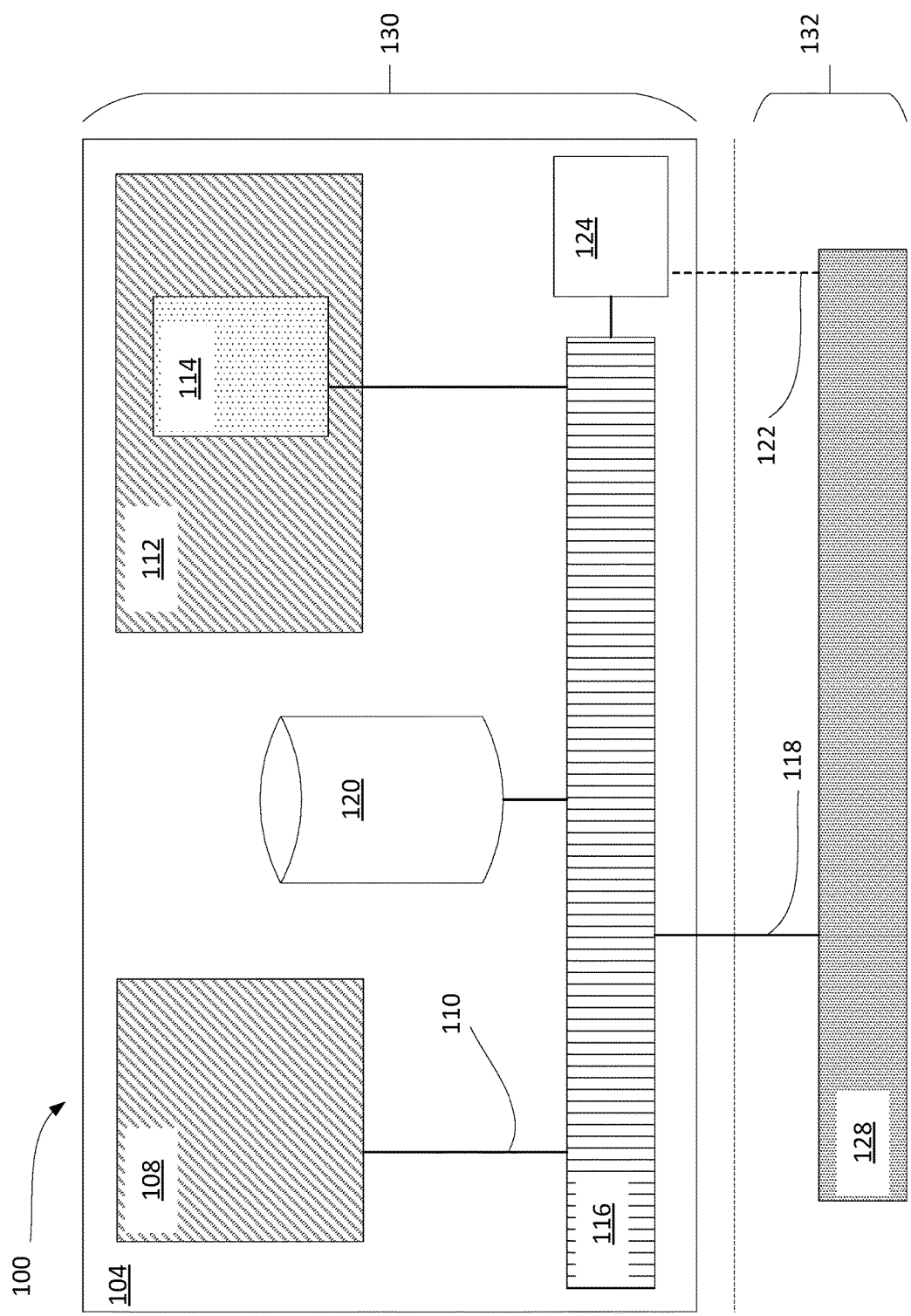
FIG. 2 shows a schematic of another implementation of a system architecture that includes additional elements as well as a communication link with a back-end system, according to one implementation.

FIG. 2 shows a schematic of another implementation of system architecture 100 that includes additional elements as well as a communication link 118 with a back-end system 132, according to one implementation. A front-end system 130 can include one or more features of the system architecture 100 described with reference to FIG. 1. The front-end system 130 can include one or more of any type of computing device, such as desktop or laptop computers, mobile computing devices, (for example, smartphones and/or tablets), workstations, a display screen (e.g., a touch screen). The front-end system 130 can represent the system a client (e.g., user) interacts with directly. The front-end system 130 may be a personal computing device that has downloaded a downloadable configured for installation on the personal computing device. The front-end system 130 may correspond to the computing system 700 of FIG. 4 and may include one or more components thereof (e.g., the display 712).

Additionally or alternatively, the front-end system 130 can include one or more data stores 120. The one or more data stores 120 can be configured for direct communication with the proxy application 116. Storage and/or extraction of information needed by one or more of the application environment 104, the application environment 112, and/or the software application 114 can be done by the data store 120 to allow more versatility and flexibility in what the system architecture 100 can allow in the front-end system 130. Thus, a single executable, for example, may be downloadable onto a client computer and allow for processing and storage directly on the client computer. This can mitigate or remove the need for network connection when running the applications associated with the system architecture 100. The one or more data stores 120 can speed up data accessing and/or execution of various tasks. Establishment of, and access to, the one or more data stores may be managed by the proxy application 116. The one or more data stores may provide caching of data from server-side devices, and/or may provide storage of data to speed up functionality of the software applications. The back-end system 132 can include a remote computing device, such as a server. The remote computing device may include a cloud computing module that can be scaled depending on required usage. The back-end system 132 may correspond to the server(s) 730 in FIG. 4. Advantageously, the proxy application 116 (in combination with the data store 120) may enable caching of data in the client-side data store (e.g., from the back-end applications), and/or may provide storage of data to speed up functionality of the front-end applications. Additionally, the system architecture may allow for improved initiation times of the software applications and/or application environments. For example, initiation of applications can occur on an as-needed basis where a particular application is initiated in the application environment when the application is needed rather than when compiling the application environment. Data storage (e.g., a data store operating within the application environment) may similarly be more efficiently allocated as cached data may only be needed for compiled applications within the application environment.

In some implementations, a computation engine 124 may allow for further functionality of the system architecture 100 on the front-end system 130. For example, the computation engine 124 may allow system architecture 100 to interact with the user. In some implementations, the computation engine 124 can communicate directly (e.g., not via the proxy application 116) with the remote computing system 128 via a direct link 122. For example, it may be advantageous to directly call certain logic or data from the remote computing system 128. This may prevent unnecessary computation by the back-end system 132 and lighten the load of the back-end system 132. In certain implementations, the computation engine 124 may share functionality with and/or be part of the proxy application 116. Additionally or alternatively, the use of the computation engine 124 may allow processes performed by the system architecture 100 to be accelerated since calls by various applications may not cause "locking up" the front-end system 130 because answers to the calls may not be dependent on computation by the back-end system 132 (e.g., at the remote computing system 128). One or more components of the system architecture 100 (e.g., the application environment 104, the software application 108, the application environment 112, the software application 114, etc.) may generate a user interface, such as a graphical user interface (GUI). The GUI or other interface may be displayed on a client device, such as the client device operating the system architecture 100. Each of the one or more components of the system architecture 100 may display corresponding visual elements, such as a summary, table, histogram, distribution, time series, grid, heatmap, pivot table, filter, column editor, enrich, link, set math, export, and/or chart visualization. Additional details on some of these visual elements and/or software applications and some of the functionality of the same can be found in U.S. Patent Application Publication No. 2018/0039399, titled "INTERACTIVE USER INTERFACE FOR DYNAMICALLY UPDATING DATA AND DATA ANALYSIS AND QUERY PROCESSING," filed on Oct. 13, 2017, which is incorporated by reference herein in its entirety for all purposes.

The computation engine 124 may also receive data entered by a user into a client device and may store and/or forward it to the other various components of the system architecture 100. The client device may, for example, be a user's desktop computer, notebook computer, smartphone, or any other type of computing device and associated software (e.g., a browser capable of rendering output from the one or more components of the system architecture 100 described herein).

The computation engine 124 may provide for execution of a sequence of instructions, such as software instructions.

Computation engine 124 may be implemented as, for example, a script interpreter (e.g., a Python or Lua interpreter), a binary loader (e.g., an ELF or PE executable loader), or other execution facilities, such as a just-in-time (JIT) compiler such as a Java Virtual Machine (JVM) or .NET Runtime. In some implementations, computation engine 124 may be responsible for initiating the rendering of one or more data items by a data renderer.

The implementations of the technology disclosed herein may be performed by additional, fewer, and/or different elements. For example, one or more of the elements of the system architecture 100 may be responsible for executing the functions of any of the other elements of the system architecture 100.

According to various implementations, one or more aspects of the system architecture 100, including one or more of the application environments described herein, may be implemented as "virtual computing environments". For example, one or both of the application environment 104 and/or the application environment 112 may be executable as a virtual computing environment. As used herein, the term "virtual computing environment" should be construed broadly to include, for example, computer readable program instructions executed by one or more processors (e.g., as described below in the example of FIG. 4) to implement one or more aspects of the modules and/or functionality described herein.

Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the application environment 104 as a virtual computing environment may advantageously enable executing different aspects or modules of the system on different computing devices or processors, which may increase the scalability of the system. Implementing one or more aspects of the application environment 104 as a virtual computing environment may further advantageously enable sandboxing various aspects, data, or modules of the system from one another, which may increase security of the system by preventing, for example, malicious intrusion into the system from spreading. Implementing one or more aspects of the system architecture 100 as a virtual computing environment may further advantageously enable parallel execution of various aspects or modules of the system, which may increase the scalability of the system. Implementing one or more aspects of the system architecture 100 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

In various implementations, outgoing requests and/or incoming responses may be communicated in any suitable formats. For example, XML, JSON, and/or any other suitable formats may be used for API requests and responses. In some implementations, the system may advantageously, as described above, convert data from one format to another (e.g., based on templates) to enable communications with multiple third-parties and APIs. Such implementations may be particularly advantageous as the system is enabled to scale and communicate via ever more disparate API's over time, and be easily adapted to changes in existing API's as needed.

With continued reference to FIG. 2, in some implementations, the system architecture 100 can allow for communication with a back-end system 132. The communication may be through a remote system link such as the communication link 118. The communication link 118 may include an Internet connection, a cloud environment connection, and/or any other network or data connection among computer systems. The proxy application 116 can be configured to output data in the application-independent language to the remote computing system 128. In some implementations, the proxy application 116 can pass information in a format/language readable by the remote computing system 128 (e.g., not necessarily an application-independent or interface definition language). The remote computing system 128 can include a remote processor, a remote server, one or more remote applications and/or application environments, one or more data stores, and/or other computer components. For example, the remote computing system 128 may include cloud computing components, such as a cloud server and/or processor.

Accordingly, the system architecture of the present disclosure, according to various implementations, advantageously provides improved routing of requests and various information from one application to another application in a standardized way (e.g., using an application-independent language and/or web idioms such as HTTP over TCP/IP). Such routing techniques may provide improved and more efficient communication between applications. For example, via the proxy application 116 the system may route requests and various information from one application to another application in a standardized way (e.g., HTTP over TCP/IP).

Figure 3:
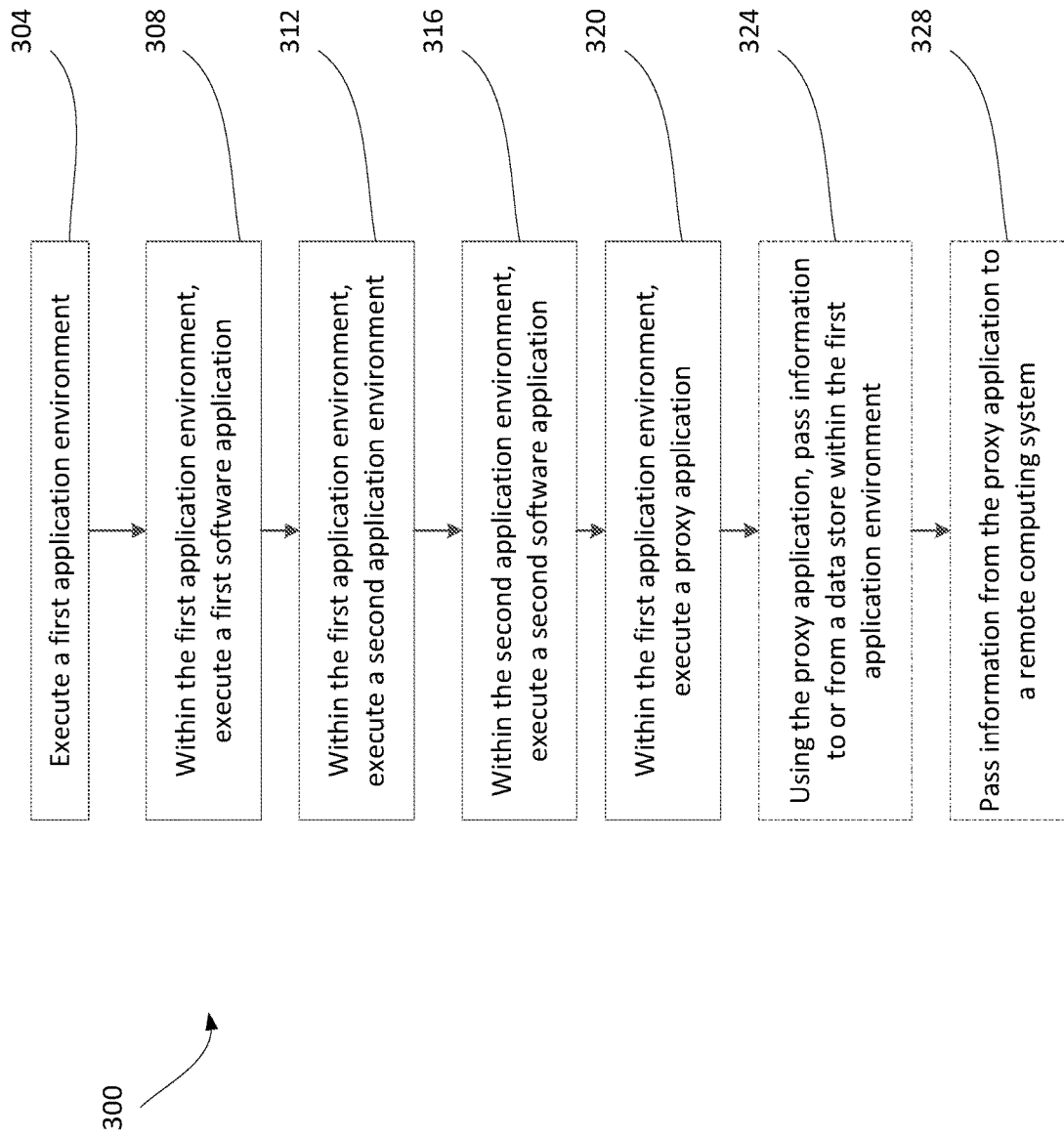
FIG. 3 shows an example computer-implemented method, according to one implementation.

FIG. 3 shows an example computer-implemented method 300, according to one implementation. The method 300 can include a number of blocks, such as one or more of those shown in FIG. 3. For example, at block 304 the method 300 can include executing, a first application environment, such as on a client-side (e.g., front end) system using a system architecture 100 described above. At block 308, within the first application environment, the method 300 can include executing a first software application. The first software application may correspond to functionality described herein with regard to the software application 108. The first application environment may share one or more features with the application environment 104 described herein.

At block 312, the method 300 can include executing a second application environment (e.g., the application environment 112). The method 300 can also include executing a second software application (e.g., the software application 114) within the second application environment. At block 316 the system can execute a second software application within the second application environment. The second application environment may correspond to the application environment 112 described above. For example, the second application environment may be configured to execute applications therein native to the application environment.

At block 320, the method 300 can include executing a proxy application within the first application environment. The method 300 can share one or more features and/or functions with the proxy application 116 described herein. For example, the proxy application 116 can be configured to pass information to the first software application and/or the second software application using an interface definition language.

At block 324, in some implementations, the method 300 can include passing information to or from one or more data stores (e.g., the data store 120) within the first application environment. Blocks that show a broken line (e.g., the block 324, the block 328) indicate that the step may be optional for a given implementation. The data store can include a plurality of data stores and the proxy application can facilitate communication (e.g., via a common software language and/or format) among the plurality of data stores. The data store(s) can provide some usable data storage for a local (e.g., client-side) instance of the first application environment, which can provide usability of the first application environment with a memory storage even without a network connection.

At block 328, the method 300 can include passing information from the proxy application to a remote computing system. The remote computing system can include one or more of the functionality and/or features of the remote computing system 128 described herein. For example, the remote computing system and the one or more data stores of the first application environment can communicate through the proxy application. Thus, the proxy application can serve as a go-between for the one or more applications and/or components of the first application environment and the remote computing system.

A number of example implementations are provided below for reference.

In a 1st example, a computing system including an application environment configured to enable efficient inter-application communications comprises: a computer readable storage medium having program instructions embodied therewith; and one or more processors configured to execute the program instructions to cause the computing system to execute a first application environment that is configured to: execute a first software application that is natively executable by the first application environment, the first software application configured to receive and transmit information in an application-independent language; execute a second application environment configured to execute a second software application that is not natively executable by the first application environment, the second software application configured to receive and transmit information in the application-independent language; and execute a proxy application configured to enable communication of information between the first software application and the second software application.

In a 2nd example, the system of example 1, wherein each of the first and second applications includes corresponding data interfaces configured to pass the information to a corresponding data interface of the proxy application using an interface definition language.

In a 3rd example, the system of any of examples 1-2, wherein the first application environment includes one or more data stores.

In a 4th example, the system of example 3, wherein the proxy application is configured to enable communication of information among the one or more data stores and the first and second software applications.

In a 5th example, the system of any of examples 1-4, wherein the proxy application is configured to enable communication of information among a server-side application remote from the computing system and the first and second software applications.

In a 6th example, the system of any of examples 1-5, wherein the first software application environment comprises a virtual machine environment.

In a 7th example, the system of any of examples 1-6, wherein the second software application environment is configured to execute software applications natively executable in at least one of a plurality of native software languages.

In a 8th example, the system of example 7, wherein the plurality of native software languages comprise at least one of JavaScript or HTML.

In a 9th example, the system of example 8, wherein the first software application is configured to natively execute in at least one of a second plurality of software languages.

In a 10th example, the system of example 9, wherein the second plurality of software languages comprises Java.

In a 11th example, a computer-implemented method comprising: executing, by a computing system including one or more processors, a first application environment; within the first application environment, executing a first software application that is natively executable by the first application environment, the first software application configured to receive and transmit information in an application-independent language; within the first application environment, executing a second application environment configured to execute a second software application that is not natively executable by the first application environment, the second software application configured to receive and transmit information in the application-independent language; and within the first application environment, executing a proxy application configured to enable communication of information between the first software application and the second software application.

In a 12th example, the method of example 11, wherein each of the first and second applications includes corresponding data interfaces configured to pass the information to a corresponding data interface of the proxy application using an interface definition language.

In a 13th example, the method of any of examples 11-12, wherein the first application environment includes one or more data stores.

In a 14th example, the method of example 13, wherein the proxy application is configured to enable communication of information among the one or more data stores and the first and second software applications.

In a 15th example, the method of any of examples 11-14, wherein the proxy application is configured to enable communication of information among a server-side application remote from the computing system and the first and second software applications.

In a 16th example, the method of any of examples 11-15, wherein the first software application environment comprises a virtual machine environment.

In a 17th example, the method of any of examples 11-16, wherein the second software application environment is configured to execute software applications natively executable in at least one of a plurality of native software languages.

In a 18th example, the method of example 17, wherein the plurality of native software languages comprise at least one of JavaScript or HTML.

In a 19th example, the method of example 18, wherein the first software application is configured to natively execute in at least one of a second plurality of software languages.

In a 20th example, the method of example 19, wherein the second plurality of software languages comprises Java.

Additional Implementation Details

Various implementations of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-implementations may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
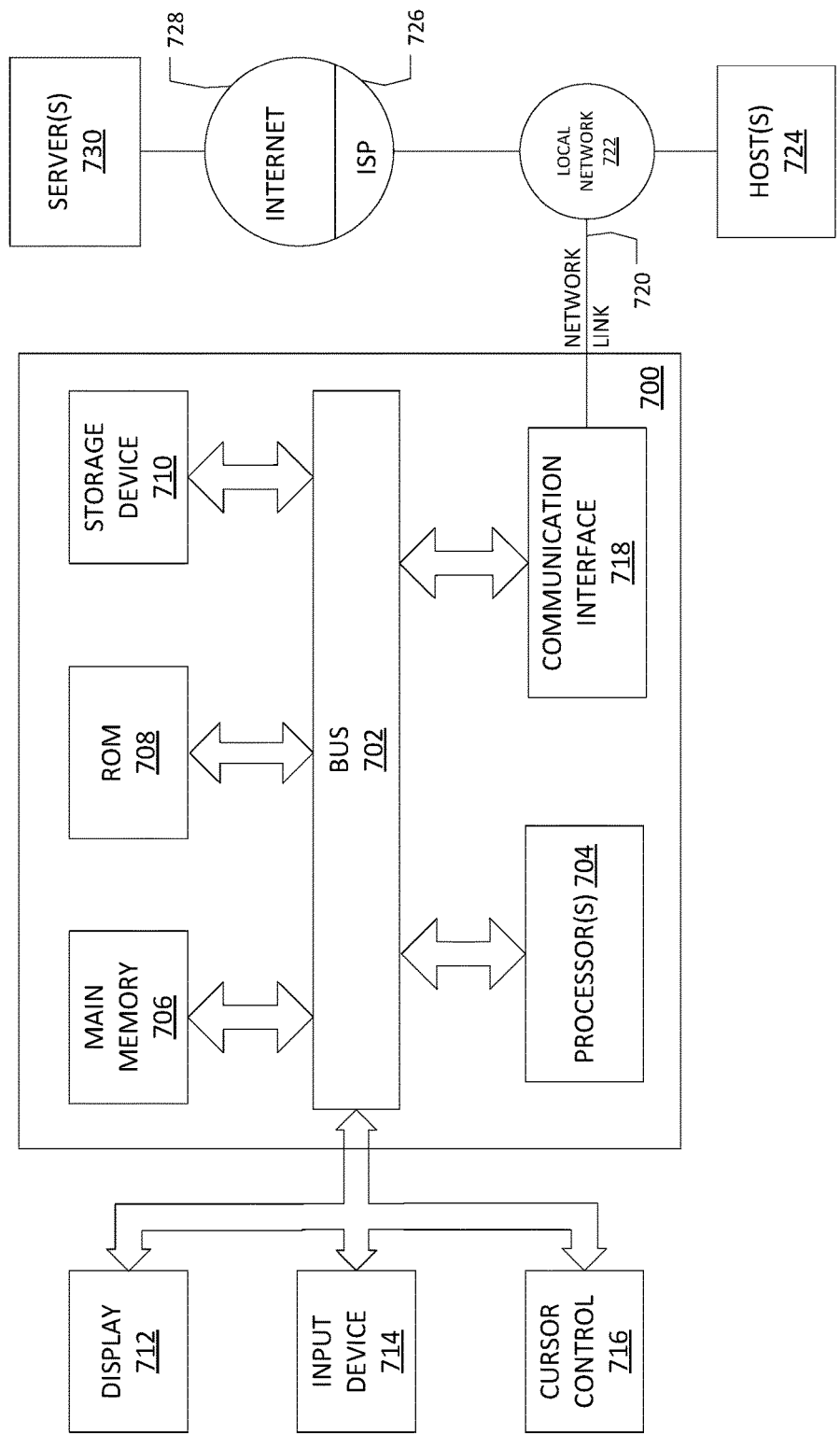
FIG. 4 is a block diagram that illustrates a computer system upon which various implementations may be implemented.

For example, FIG. 4 is a block diagram that illustrates a computer system 700 upon which various implementations may be executed. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some implementations, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one implementation, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative implementations, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
   one or more computer readable storage mediums having program instructions embodied therewith; and
   one or more processors configured to execute the program instructions to cause the computing system to execute a first application environment configured to:
   execute a first software application;
   execute a second application environment configured to execute a second software application that is not natively executable by the first application environment; and
   execute one or more application programming interfaces ("APIs") configured to enable communication between the first software application and the second software application.

2. The computing system of claim 1, wherein executing the one or more APIs comprises executing a proxy application configured to enable communication of information between the first software application and the second software application.

3. The computing system of claim 2, wherein the first application environment includes one or more data stores.

4. The computing system of claim 3, wherein the proxy application is configured to enable communication of information among the one or more data stores and the first and second software applications.

5. The computing system of claim 2, wherein each of the first and second applications includes corresponding data interfaces configured to pass the information to a corresponding data interface of the proxy application using an interface definition language.

6. The computing system of claim 2, wherein the proxy application is configured to enable communication of information among a server-side application remote from the computing system and the first and second software applications.

7. The computing system of claim 1, executing a computation engine configured to store and execute instructions received from the first software application, the second software application, or both.

8. The computing system of claim 7, wherein the computation engine is configured to communicate directly with a server-side application remote from the computing system and the first and second software applications.

9. The computing system of claim 7, wherein the computation engine is configured to receive and store data entered by a user into a client device.

10. The computing system of claim 7, wherein the computation engine comprises a script interpreter.

11. The computing system of claim 1, wherein the first software application is natively executable by the first application environment.

12. The computing system of claim 1, wherein the first software application environment comprises a virtual machine environment.

13. The computing system of claim 1, wherein the second software application environment is configured to execute software applications natively executable in at least one of a plurality of native software languages.

14. A computer-implemented method comprising:
    within a first application environment:
    executing a first software application;
    executing a second application environment configured to execute a second software application that is not natively executable by the first application environment; and
    executing one or more application programming interfaces ("APIs") configured to enable communication between the first software application and the second software application.

15. The method of claim 14, further comprising executing, within the first application environment, a computation engine configured to store and execute instructions received from the first software application, the second software application, or both.

16. The method of claim 15, wherein the computation engine is configured to communicate directly with a server-side application remote from the computing system and the first and second software applications.

17. The method of claim 15, wherein the computation engine comprises a script interpreter.

18. The method of claim 14, wherein the first software application is natively executable by the first application environment.

19. The method of claim 14, wherein executing the one or more APIs comprises executing a proxy application configured to enable communication of information between the first software application and the second software application.

20. A non-transitory computer-readable medium storing a set of instructions that are executable by one or more electronic devices, each having one or more processors, to cause the one or more electronic devices to perform a method, the method comprising:
    within a first application environment:
    executing a first software application;

executing a second application environment configured to execute a second software application that is not natively executable by the first application environment; and executing one or more application programming interfaces ("APIs") configured to enable communication between the first software application and the second software application.

\* \* \* \* \*